United States Patent [19]

Kobelt

[11] Patent Number: 4,898,203
[45] Date of Patent: Feb. 6, 1990

[54] VALVE APPARATUS

[76] Inventor: Jacob Kobelt, 6110 Oak St., Vancouver, British Columbia, Canada, V6M 2W2

[21] Appl. No.: 247,725

[22] Filed: Sep. 22, 1988

[51] Int. Cl.[4] .......................................... F15B 13/043
[52] U.S. Cl. .................................. 137/269; 137/271; 137/596.16; 137/596.18; 137/627.5; 137/884
[58] Field of Search ................... 137/269, 271, 596.14, 137/596.16, 596.18, 627.5, 884

[56] References Cited

U.S. PATENT DOCUMENTS

| | | | |
|---|---|---|---|
| 2,910,088 | 10/1959 | Natho | 137/627.5 |
| 2,985,490 | 5/1961 | Gates | 137/596.18 X |
| 3,215,158 | 11/1965 | Bass et al. | 137/596.16 X |
| 3,709,247 | 1/1973 | Roth et al. | 137/271 |
| 3,840,047 | 10/1974 | Gibbins | 137/596.15 |
| 3,945,401 | 3/1976 | Greenwood | 137/627.5 |
| 4,071,046 | 1/1978 | Cates | 137/627.5 X |
| 4,488,343 | 12/1984 | Kobelt | 137/271 X |

Primary Examiner—Gerald A. Michalsky
Attorney, Agent, or Firm—Bull, Housser & Tupper

[57] ABSTRACT

The valve apparatus has a poppet valve engaging a valve seat to seal an outlet port from an inlet port thereof. A piston is reciprocable within a piston chamber, and first and second piston ports communicate with opposite sides of the piston. The piston cooperates with the poppet valve and is biased to an extreme position thereof, in opposition to force from a fluid signal applied to the piston through one of the piston ports. The valve configuration can be changed in the field to be either normally-open or normally-closed by re-positioning the piston biasing and redirecting fluid into the appropriate piston port using an interchangeable piston port distributing structure. The valve can be solenoid actuated, manually operated or pilot-pressure actuated from an adjacent valve, and the type of valve actuation can also be changed in the field. Also, a supply manifold member is secured to the inlet port of the valve to supply fluid thereto. Similar manifold members can be connected together, and similar valves can be connected to respective manifold members to receive air from the same supply.

32 Claims, 5 Drawing Sheets

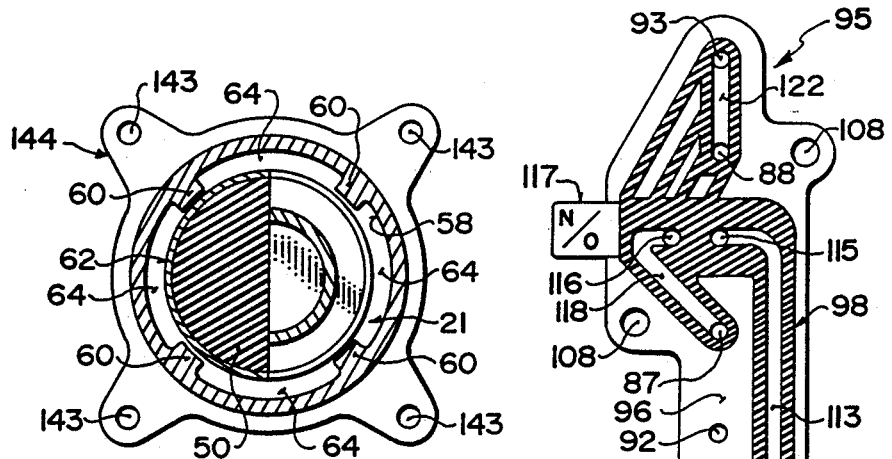
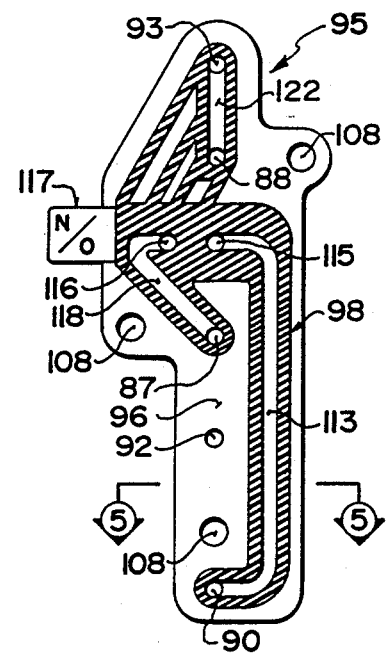
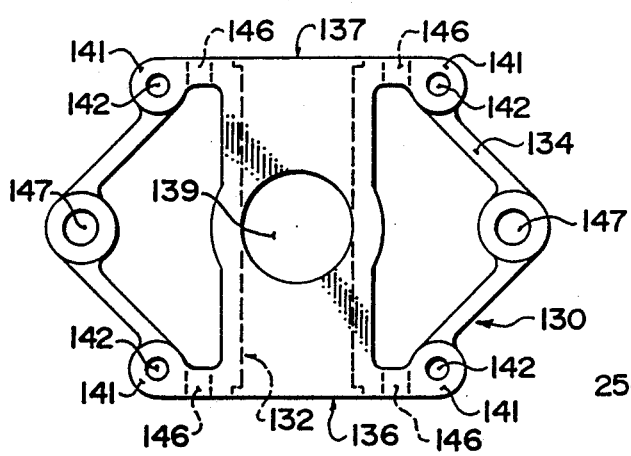
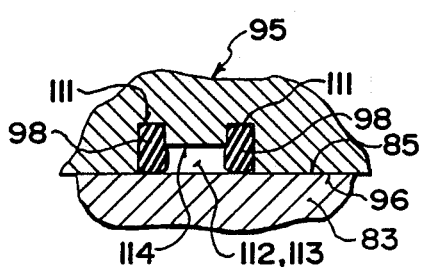
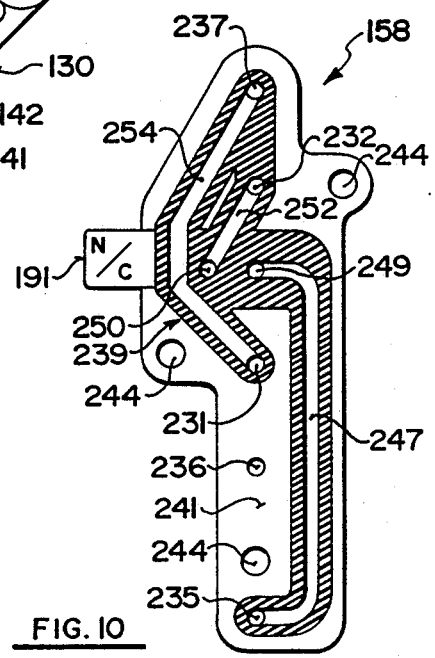

VALVE APPARATUS

BACKGROUND OF THE INVENTION

The invention relates to a fluid valve apparatus, particularly for controlling pneumatic components in marine and industrial applications.

Fluid control valves have been known for many years, and most manufacturers suPPly a wide range of valves, such as three-way, normally-open or normally-closed valves, or four-way, normally-open or normally-closed valves, which can be solenoid-actuated, manually-actuated or pilot pressure-actuated etc. Specific applications sometimes require a complex combination of ports and valve configurations, which sometimes require changing after installation for specific applications. In view of the large number of combinations of valves required, manufacturers and suppliers are required to maintain large inventories of different valve types, plus large numbers of spare parts for the many types of valves. Large inventories are costly to supPly and control, and servicing charges for pneumatic installations can be high in view of the complexity of stocking the valves, the skill required in selecting the right valve for a particular application, and the time consuming repair or replacement of relatively low cost components in such valves.

In some applications, field repairs or substitutions, it is desirable to interchange a valve normally-closed valve, or vice versa, and this usually requires a complete replacement of the existing valve with a substitute valve. To the inventor's knowledge, it is not possible to change an existing valve from a normally-open configuration to a normally-closed configuration without complete replacement of the valve, or at least replacement of many of the major components of the valve.

Furthermore, while it is known to stack valves together on a common manifold to receive pressurized fluid from a common supply, such manifolds are normally custom made for the particular application. The manifolds usually consist of a U-sectioned channel, provided with a cover plate with fastening means to connect the valve thereto. In such an arrangement, unless the manifold has a reserve connection capacity to permit connection of additional valves thereto, if additional valves are required in an application a completely new manifold member is required. Thus, it is common to carry a wide variety of manifold members for supplying air to such valves also. To the inventor's knowledge, there are no manifold members which permit stacking of manifold members together to increase the capacity of an existing manifold to supply fluid to additional valves.

SUMMARY OF THE INVENTION

The invention reduces the difficulties and disadvantages of the prior art by providing a valve apparatus which has a configuration which is interchangeable in the field by replacement of a relatively small, low-cost item, thus permitting a valve to be converted from a normally-open configuration to a normally-closed configuration, or vice versa. Furthermore, this valve has a versatility not found in prior art valves which permits the valve to be controlled either by a pilot pressure signal from a similar valve, or by a solenoid or manually activated valve by substitution of a relatively small component to effect major changes to the operation of the valve.

The valve is used in combination with a manifold member which supplies fluid under pressure to the input port of the valve. The manifold member has inlet and outlet ports which permit similar manifold members to be connected together to form a manifold member assembly to which additional valves can be attached, so that the additional valves communicate with a fluid supply common to the first valve. In this way, the combination of the valve assembly and supply manifold member permit modification to an existing valve combination in the field, so as to increase versatility, facilitate changes, and permit improvised repairs. All this can be attained by use of a few components, most of which would be common to all valves of a similar size, which components thus simplify manufacturing and stocking or inventory of new parts and spare parts for the valves.

A valve apparatus according to the invention includes a valve body, a poppet valve member, a piston, a valve actuator, piston biasing means and fluid signal input means. The valve body has an axially disposed main chamber, and an inlet port, an outlet port and an exhaust port communicating with the main chamber. The valve body also has a valve seat disposed between the main chamber and the inlet port, an axially disposed piston chamber, and first and second piston ports communicating with the piston chamber. The poppet valve member is engageable with the valve seat to seal the main chamber from the inlet port as required. The piston divides the piston chamber into first and second piston spaces and is reciprocable within the piston chamber between first and second extreme positions within the piston chamber. The first and second piston spaces communicate with the first and second piston ports respectively. The valve actuator cooperates with the piston and poppet valve member to actuate the valve member when required. The piston biasing means cooperates with the piston to apply force thereto, direction of force being selectable to move the piston to an extreme position thereof. The fluid signal input means communicates with one of the piston ports to admit fluid into the respective piston space to apply a force to the piston in opposition to force from the piston biasing means.

The valve apparatus also includes a supply manifold member having a manifold body having a main bore extending therethrough. The main bore has supply and discharge ports at opposite ends thereof and also has a valve port communicating with the main bore thereof. The manifold member has first fastening means for fastening the supply manifold member to the valve apparatus to permit the valve port of the supply manifold member to communicate with the inlet port of the valve apparatus. The supply manifold member has second fastening means for fastening to a similar supply manifold member so that the discharge port of the first supply manifold member is registered with the supply port of the second manifold member. In this way, the respective main bores of the manifold members are connected together to permit a plurality of supply manifold members to be stacked in series to pass fluid through the interconnected main bores.

A detailed disclosure following, related to drawings, describes a preferred apparatus according to the invention, which is capable of expression in apparatus other than that particularly described and illustrated.

DESCRIPTION OF THE DRAWINGS

FIG. 2 is a simplified transverse cross-section on line 2—2 of FIG. 1, FIG. 4 is a simplified side elevation of an inner surface of a signal manifold member, the valve showing a porting and groove array and resilient sealing means thereon for a normally-open valve as would be seen from line 4—4 of FIG. 1, FIG. 5 is a simplified fragmented section on line 5—5 of FIG. 4, showing cooperation of the signal manifold member with an intermediate transfer plate, FIG. 6 is a top plan view of a manifold member, as would be seen on line 6—6 of FIG. 1, FIG. 10 is a simplified side elevation of an inner surface of a signal manifold member of the second valve, showing a porting and groove array and resilient sealing means thereon for the piloted, normally-closed valve configuration, as seen from line 10—10 of FIG. 9.

DETAILED DISCLOSURE

FIGS. 1 through 6

Figure 1:
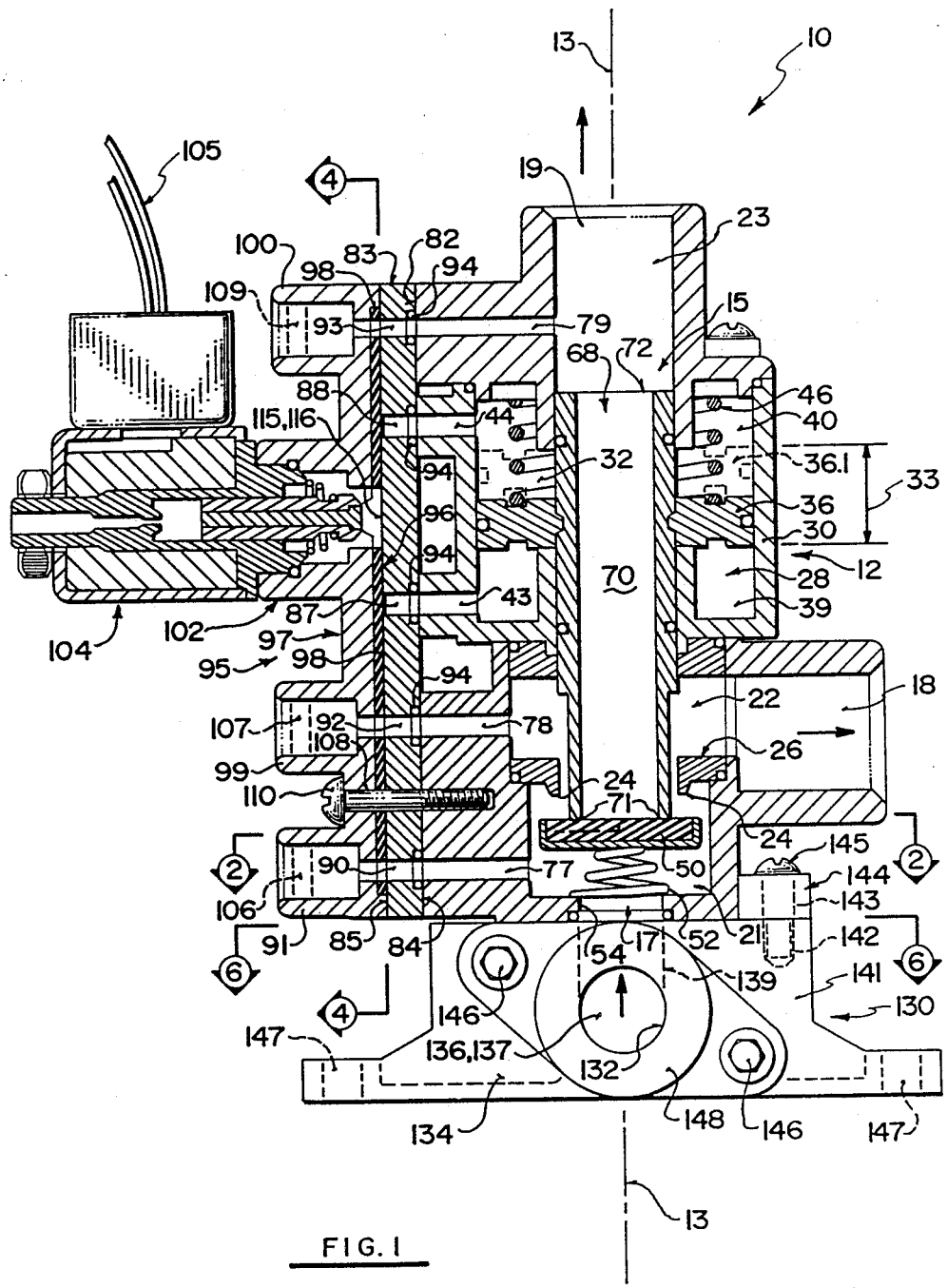
FIG. 1 is a simplified longitudinal section of a valve apparatus according to the invention, a plane of section being taken on a diametrical plane containing a main longitudinal axis of the valve, the valve having a normally-open configuration and being shown in an open condition.

Referring mainly to FIG. 1, a valve apparatus 10 according to the invention has a valve body 12 having a main longitudinal axis 13, and for this example the valve is assembled in a normally-open configuration. The valve body has an axially disposed main chamber 15, and an inlet port 17, an outlet port 18, and an exhaust port 19, all the ports communicating with the main chamber. The valve is specifically adapted for pneumatic applications, and in the example to be described air is the normal working fluid which passes through the ports 17, 18 and 19, as required, in the direction of undesignated arrows. However, the valve could have applications for liquids, namely hydraulic fluid or oil, and thus the term "fluid" herein refers to both gases and liquids.

The body 12 also has inlet, outlet and exhaust chambers 21, 22 and 23 communicating with the inlet, outlet and exhaust ports respectively and the main chamber as shown. The valve body has a valve seat 24 disposed between the inlet and outlet chambers, i.e. between the main chamber and the inlet port as shown, and is integral with an annular seat member 26 which is fitted within and defines most of the outlet chamber. The valve body also includes an axially disposed piston chamber 28 which surrounds the main chamber 15, so that the chambers are disposed concentrically and symmetrically relative to the axis 13. The main chamber 15 has a main side wall 30 having an annular clearance opening 32 therein extending around the sidewall, the opening 32 having an annular axial width 33.

The apparatus has a piston 36 which divides the piston chamber into first and second piston spaces 39 and 40 located on sides of the piston adjacent the outlet and exhaust ports respectively. The piston 36 is reciprocable within the piston chamber 28 between a first extreme position, shown in full outline, and a second extreme position, shown partially in broken outline designated 36.1. When the piston is in the first position (full outline), the valve is open, and when in the second position (broken outline), the valve is closed. It can be seen that limits of movement of the piston are defined by interference between undesignated side walls of the annular clearance opening 32, in which the width thereof accommodates and limits movement of the piston.

The body also has first and second piston ports 43 and 44 which communicate with the first and second piston spaces 39 and 40 of the piston chamber 35 as shown. Because the valve apparatus 10 is a normally-open valve, a compression piston spring 46 is located within the second piston space 40 and tends to bias or force the piston 36 towards the inlet port. As will be described with reference to FIGS. 7-10, the valve configuration is interchangeable and the valve can be changed to a normally-closed valve, in which case the compression spring is removed from the second piston space and placed in the first piston space.

A valve poppet member 50 is located between the inlet port 17 and the valve seat 24 and is engageable with the valve seat to seal the main chamber 15 from the inlet port. A conical compression valve spring 52 extends between a rim portion 54 of the inlet port and the poppet valve member 50 to urge the valve member against the valve seat as shown. In practice, the valve spring 52 can be a relatively light spring as valve sealing is attained usually by pressure differences across the valve.

Referring to FIG. 2, the inlet chamber 21 has an inner side wall 58 which is generally circular in cross-section and is provided with a plurality of axially disposed projections 60, four such projections being shown spaced equally circumferentially around the side wall. The valve poppet member 50 has a circular periphery 62 which has a size sufficient to fit snugly between the axial projections 60. The periphery 62 lightly engages the projections 60 to guide the valve member 50 to maintain smooth, even axial movement of the valve member, with negligible rocking or "binding" of the valve member on the projections. The projections also maintain peripherally spaced, partially annular clearance openings 64 between the side wall 58 and the valve member 60. The clearance openings 64 permit flow of air around the valve member when the valve member is in an open position as shown in full outline in FIG. 1.

Referring again to FIG. 1, the apparatus has a valve actuator 68 which is a sleeve having a sleeve bore 70, and first and second end portions 71 and 72 respectively adjacent the inlet and exhaust ports 17 and 19 respectively. The end portion 71 has an annular end face which is urged against the valve poppet member 50, and is separable therefrom in the valve closed position as will be described, so as to permit air to flow from the first end 71 to the second end 72 of the sleeve to permit the outlet port to communicate with the exhaust port. The piston 36 is secured to an outer portion of the sleeve, adjacent the annular clearance opening 32 so that force from the spring forcing the piston downwardly simultaneously forces the actuator downwardly to move the valve poppet member 50 off its respective valve seat 24, as shown in full outline in FIG. 1. It can be seen that the piston cooperates with the valve actuator to act in unison so as to actuate the valve member when required.

Figure 3:
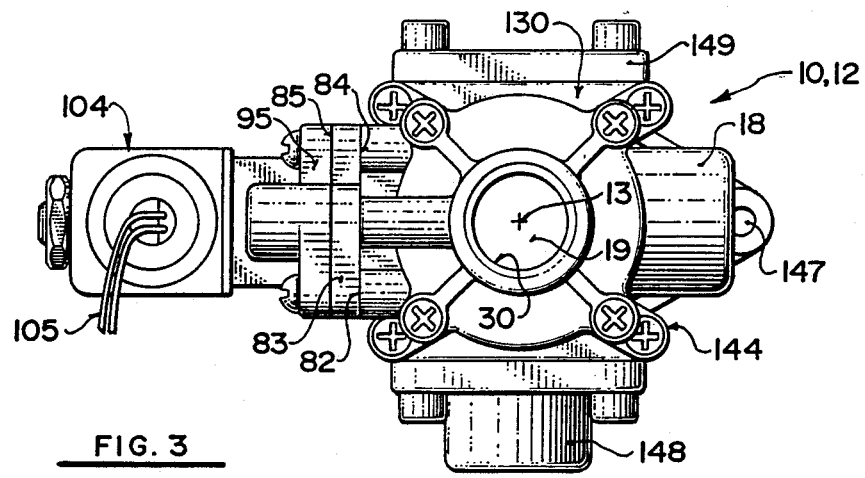
FIG. 3 is a simplified top plan view of the apparatus of FIG. 1.

The valve body 12 has a valve body side wall portion 82 which is disposed on a side of the valve body remote from the outlet port 18 as shown. The side wall portion 82 has an inlet bleed conduit 77, an outlet bleed conduit 78 and an exhaust bleed conduit 79 which communicate with the respective inlet, outlet and exhaust chambers 21, 22 and 23 respectively. The body side wall portion 82 extends as a generally tangential plane, as seen in FIG. 3, between the inlet and exhaust bleed conduits 77 and 79, as seen in FIG. 1, which plane also encompasses the outlet bleed conduit 78, as well as the first and second piston ports 43 and 44 respectively. Because the valve body is assembled from several components, care should be taken that the body side wall portion 82 is generally flat and machined to a high precision to enable effective sealing thereagainst as will be described. Preferably, all the port and conduit openings are within an axial or diametrical plane containing the main longitudinal axis 13. In this way, the bleed conduits 77, 78 and 79, and the piston ports 43 and 44, are aligned axially along the body side wall portion 82.

The apparatus includes an intermediate transfer plate 83 which has inner and outer surfaces 84 and 85 respectively. The inner surface 84 is flat and complementary to the side wall portion 82 to provide effective sealing thereagainst. The plate 83 has a plurality of parallel transfer openings extending therethrough which are adapted to register with openings in the side wall portion 82 as follows. The transfer openings include first and second transfer openings 87 and 88 which are adapted to register with the first and second piston ports 43 and 44 as shown. The plate 83 also has third, fourth and fifth transfer openings 90, 92 and 93 respectively which are adapted to register with the inlet bleed conduit 77, the outlet bleed conduit 78 and the exhaust bleed conduit 79 respectively. The transfer openings 87, 88, 90, 92 and 93 of the transfer plate are disposed along a line parallel to the axis 13 of the valve as shown in FIG. 1. The inner surface 84 of the plate 83 has annular grooves extending around each transfer opening to receive respective O-ring seals 94, to provide an air-tight seal between the inner surface 84 of the plate and the body side wall portion 82. The O-ring seals resist possible leakage between the plate 83 and the portion 82 by accommodating slight variations between adjacent portions of the valve body when assembled, which tend to result in small "steps" at joins between adjacent components.

The apparatus also includes a piston port distributing means which includes a signal manifold member 95 which has inner and outer surfaces 96 and 97 as shown. The inner surface 96 is generally flat, complementary to, and in contact with the outer surface 85 of the transfer plate 83, so as to form an air-tight seal therewith, when used in combination with a signal manifold resilient sealing means 98. The sealing means 98 is fitted within grooves on the inner surface 96 of the manifold member 95, as will be described with reference to FIGS. 4 and 5 and held against the surface 85. The outer surface 97 of the signal manifold member 96 has inlet, outlet and exhaust manifold connections 91, 99 and 100 which are spaced apart and positioned to be aligned with transfer openings 90, 92 and 93 in the plate 83, so as to communicate with the inlet, outlet and exhaust chambers 21, 22 and 23 respectively of the body 12.

The signal manifold member 95 has a manifold input signal means 102 which is adapted to receive various input devices as required. In the particular application as shown, a three-way, normally-closed, two-position solenoid valve 104 is shown fitted, e.g. by sealed threads, and receives electrical power and signals through an electrical supply line 105. When the solenoid is de-energized, its plunger, shown partly in FIG. 1, is displaced inwardly toward the plate 83 and air is exhausted outwardly along a passage away from the plate 83. Air is supplied to the solenoid internally by the sealing means 98 as will be described, and when actuated the solenoid valve directs the air to the first transfer opening 87 through to the aligned first piston port 43, when the valve apparatus 10 is assembled in the normally-open configuration as shown. Other input means can be substituted, for example a directly or remotely actuated, 3-way, 2-position manual valve (not shown) that directs air similarly to the solenoid valve.

It can be seen at the bleed conduits 77, 78 and 79 and the piston ports 43 and 44 of the body 12 are registered with corresponding transfer openings in the intermediate transfer plate 83. The bleed conduits 77, 78 and 79 communicate with respective manifold connections 91, 99 and 100 on the outer surface 97 of the manifold member, which connections have internally threaded bores. The bores can be used to connect to conventional fluid couplings, or can be plugged, depending on the particular configuration and application of the valve. As shown in FIG. 1, the manifold connections 91, 99 and 100 are provided with threaded sealing plugs 106, 107 and 109 respectively which eliminate fluid passing through the respective connections when not required. Depending on the particular applications of the valve, the resilient sealing means 98 and the member 95 provide communication with either the first or second piston port so as to discharge pressurized fluid into one piston port, and to receive pressurized fluid from the remaining port, so as to control air flow into and out from the piston chamber as described below.

Referring also to FIGS. 4 and 5, the signal manifold member 95 has three clearance openings 108 to receive screws for securing the plate to the body 12, one typical screw 110 and opening being shown only in FIG. 1. The inner surface 96 of the manifold member 95 has a plurality of seal grooves therein, the grooves being grouped as pairs to define opposite conduit walls, a typical pair of seal grooves 111 being shown in section in FIG. 5. The grooves are generally square bottomed, and resemble in some ways grooves for O-ring seals. The resilient sealing means 98 is a molded elastomeric material which seals with adjacent surfaces when located in the grooves and thus serves as conduit wall seals as will be described. A clearance space 112 between the grooves defines a conduit or first transfer groove 113 between the two portions of the sealing means 98, the outer surface 85 of the intermediate transfer plate, and a clearance surface 114 of the inner surface 96 of the manifold member 95. The grooves are arranged in a particular routing pattern on the inner face 96 of the manifold member to conduct fluid between various transfer openings, depending on the application of the valve. The relative locations of transfer openings or fluid inputs or outputs on the transfer plate are shown as circles in FIG. 4.

As will be described with reference to FIG. 4, the solenoid valve 104 (FIG. 1) receives air from a solenoid valve fluid input location 115, and discharges air as required into a solenoid valve fluid output location 116 spaced closely thereto and adjacent to the surface 96.

Referring to FIG. 4, an undesignated solid portion of resilient sealing means extends between the locations 115 and 116 to prevent air passing directly between the two locations. The first transfer groove 113 on the surface 96 extends from the third transfer opening 90 to the solenoid valve fluid input location 115 to supply fluid from the inlet chamber 21 to the solenoid valve. A second transfer groove 118 on the surface 96 extends from the solenoid valve fluid output location 116 to the first transfer opening 87, to supply fluid from the solenoid valve to the first piston space 39 serving as an inlet conduit. Clearly, the location 116 serves as an input signal connection to receive an input signal for the space 39. A third transfer groove 122 on the surface 96 extends from the second transfer opening 88 to the fifth transfer opening 93 to conduct fluid from the second piston space to the exhaust chamber 23 thus serving as an outlet conduit.

As seen in FIG. 4, the resilient sealing means 98 is molded in one piece, and has undesignated connecting portions which connect the portions of the sealing means which form the transfer groups. This is for convenience of manufacturing and installation and clearly the design can be a subject to various changes. Preferably, an identity tab 117, marked "N/O" for identifying the sealing means as that for a "normally-open" valve is provided. The tab is positioned adjacent an outer portion of the sealing means to extend outwardly from the manifold member when installed, so as to be visible and to identify the valve configuration.

In summary, referring to FIGS. 1 and 4, some fluid from the inlet chamber 21 is conducted through the first transfer groove 113 (FIG. 4) to the solenoid valve which distributes that fluid, as required, through the groove 118 (FIG. 4) to the first piston space 39 (FIG. 1), acting in opposition to the spring force so as to compress the spring 46 and permit the valve to close. Fluid displaced from the second piston space 40 is conducted through the third transfer groove 122 (FIG. 4) into the exhaust chamber 23 (FIG. 1). For this situation, the sealing plugs 106 and 107 prevent discharge of air through the connections 91 and 99, the location of the transfer opening 92 being shown in FIG. 4 and not serving any purpose in this particular installation. Similarly, the sealing plug 109 fitted in the exhaust manifold connection 100 prevents discharge of fluid from the second piston space into atmosphere surrounding the valve. This is for an installation where discharge of air (or other fluid) from the second piston space through the connection 100 into atmosphere could be hazardous, and thus is for an explosion proof installation as described. The air is discharged back into the exhaust chamber 23 so as to exhaust with the remainder of the air from the valve in a common exhaust conduit. For an explosion-proof installation, any discharge of gas from the solenoid valve should be vented remotely into atmosphere, which can be done by a separate line to atmosphere, or alternatively, the sealing plug 109 can be removed from the manifold connection 100, and the discharge line from the solenoid could be connected directly to the manifold connection 100 so as to discharge air from the solenoid directly through the exhaust bleed conduit 79 into the exhaust chamber 23.

Referring also to FIGS. 1 and 6, the valve apparatus 10 also includes a supply manifold member 130 having a manifold body 134 with a main bore 132 extending therethrough. The main bore has supply and discharge ports 136 and 137 at opposite ends thereof, the port 137 being sealed with a sealing cap, not shown in FIG. 6. The manifold body also has a valve port 139 communicating with the main bore 132 thereof and being registered with the inlet port 17 of the valve apparatus. The manifold member has a plurality of peripheral extensions 141 having screw threaded openings 142 extending therethrough, which openings register with clearance openings 143 in a base portion 144 of the valve body, one clearance opening only being shown in FIG. 1. Similar clearance openings 143 in the base portion of the valve body are seen in FIG. 2. Screws 145 pass through the clearance openings 143 in the body to engage the threaded openings 142 in the manifold member and serve as first fastening means for fastening the valve apparatus to the supply manifold member to maintain the valve port 139 and inlet port 17 in registration. The member 130 also has openings 147 to receive fasteners for securing the member 130 to other components, etc., and openings 146 to receive screws which serve as second fastening means for fastening several supply manifolds together to be described with reference to FIGS. 7 and 8, or for cooperating with a fluid supply or blanking plate to be described with reference to FIG. 3.

OPERATION

In operation, the valve apparatus 10 (see FIG. 1) is secured to the supply manifold member 130 using the four screws 145 so that the valve port 139 and inlet port 17 are in registration. As seen in FIG. 3, a fluid supply 148 is connected to either of the ports 136 or 137, (see FIG. 6) and because the valve is to be operated by itself, the remaining port is sealed with a blanking plate 149. An apparatus to be actuated by the valve is connected with a conduit, not shown, to the outlet port 18 of the valve apparatus, and air discharged from the valve is ducted to exhaust through the exhaust port 19.

Referring mainly to FIG. 1, as the valve is a normally-open valve, when the solenoid 104 is deactivated, pressurized fluid is not supplied to the first piston space 39. Thus force from the piston spring 46 holds the piston 36 to a lowered position as shown, which correspondingly holds the valve actuator 68 similarly in the lowered position. In this position, the valve member 55 is spaced from the seat 24 by force from the valve actuator, so as to open the valve and compress the spring 52. Fluid under pressure in the supply manifold member 130 passes through the aligned ports 17 and 139 into the inlet chamber 21. Because the valve is open, fluid can pass through the annular clearances 64 (FIG. 2) spaced around the valve poppet member 50, and into the outlet chamber 22 where it can discharge through the outlet port 18 to the apparatus to be actuated.

Pressurized fluid in the inlet chamber 21 also passes along the inlet bleed conduit 77, through the third transfer opening 90 in the plate 83 and into the first transfer groove 113 (FIG. 4) of the sealing means 98 to pass up to the solenoid valve fluid input location 115. Because the solenoid valve is not activated, the fluid is trapped at this location and thus is inactive.

When an activating signal is fed to the solenoid 104 through the electrical line 105, the solenoid immediately shifts, so as to permit the fluid in the first transfer groove 113 to be switched, by the solenoid, from the input location 115 to the solenoid output location 116 (FIG. 4) thus bypassing the solid obstruction between the locations. This fluid then discharges through the second transfer groove 118 (FIG. 4) to the first transfer opening 87, which is in register with the first piston port 43, see FIG. 1. Fluid under pressure thus enters the first piston space 39, and overcomes force from the piston spring 46, thus moving the valve actuator 68 upwardly. This permits the valve member 50 to move upwardly also, under influence of the valve spring 52, so as to re-engage the valve seat 24 thus sealing the valve. Air pressure within the inlet chamber 21 augments sealing, and thus the inlet chamber is now isolated from the outlet chamber.

As the valve actuator 68 moves upwardly, the piston 36 contacts an upper periphery of the circular clearance opening 32, limiting further movement of the valve actuator. In this position, a small clearance exists between the first end portion 71 of the valve actuator and the valve member 50, thus permitting air from the outlet chamber 22 to pass upwardly up the sleeve bore 70 so as to exhaust through the exhaust port 19.

It is noted that fluid displaced by upwards movement of the piston 36 is displaced from the second piston space 40 through the second piston port 44, into the second transfer opening 88, and then into the fifth transfer opening 93 via the third transfer groove 122 (see FIG. 4). In this way, fluid exhausted from the second piston space joins fluid exhausted from the outlet chamber 2 and sleeve bore 70. As previously stated, in a non-explosive application, air from the second piston space could simply exhaust through the manifold exhaust port 100.

ALTERNATIVES

The application shown in FIGS. 1 through 6 relates to a single, normally-open valve used in a simple application for controlling one apparatus, the valve being operated by a solenoid. The present invention permits stacking of two or more valves together to receive fluid from a common supply manifold, and using one valve if necessary to control a second or more valves which can be of different configuration and mode of operation.

FIGS. 7–10

Figure 7:
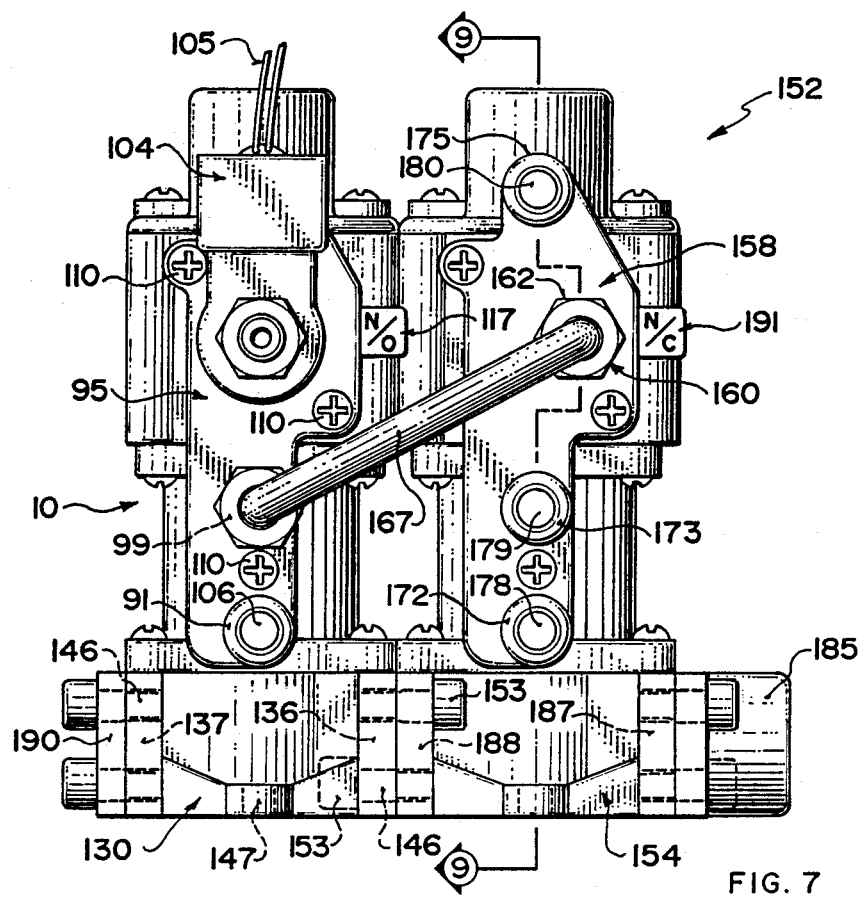
FIG. 7 is a side elevation of a pair of generally similar first and second valves stacked together in a valve combination on similar stacked manifold members, in which the first valve is a normally-open valve and is controlled by a solenoid, and supplies pilot pressure to control the second valve, the second valve being a pilot pressure actuated normally - closed valve.
Figure 8:
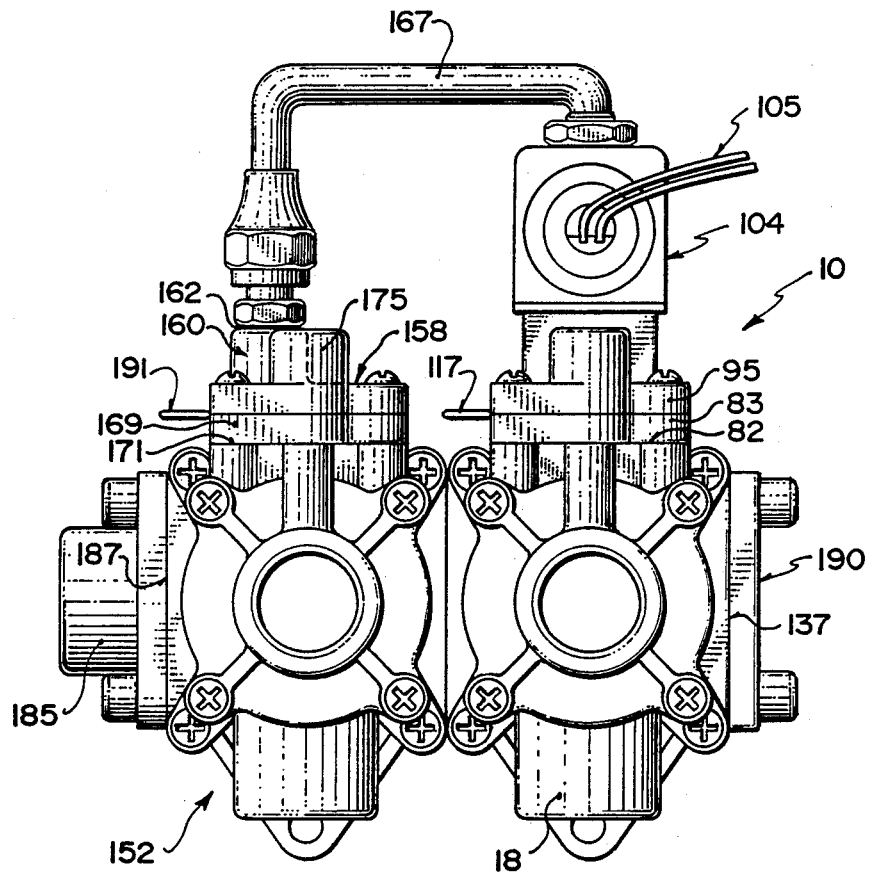
FIG. 8 is a simplified top plan view of the valve combination of FIG. 7.

Referring particularly to FIGS. 7 and 8, a second valve apparatus 152 is shown secured to a second supply manifold member 154. The member 154 is connected to the first supply manifold member 130 by fasteners 153, being shown passing through aligned fastener openings 146. The second valve apparatus 152 has generally similar components to the first valve apparatus 10, but is assembled to be in a normally-closed configuration, and is "piloted" or actuated by a pilot pressure output signal from the first valve 10. In contrast with the first valve apparatus 10, the second valve apparatus thus does not require a solenoid similar to the solenoid 104, but instead is controlled directly by pilot pressure signals outputted by the first valve apparatus.

The second valve apparatus has a second signal manifold member 158 which is adapted for receiving the pilot signal from the first valve apparatus 10, but other aspects of the signal manifold member 158 are generally similar to those of the signal manifold 95. The member 158 has a pilot inlet signal means 160 which has a threaded pilot manifold connection 162.

Figure 9:
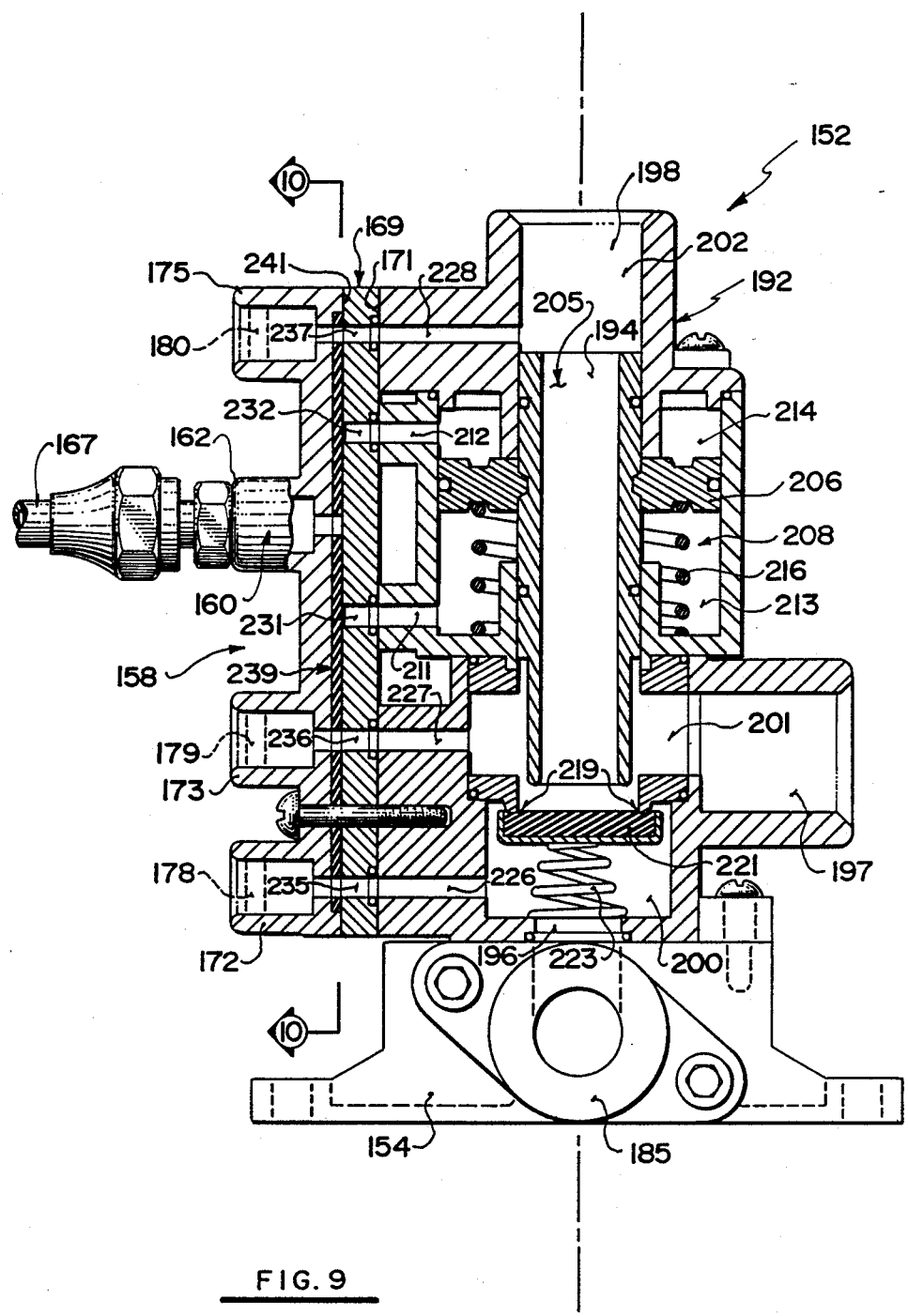
FIG. 9 is a simplified longitudinal section of the second valve according to the invention, as seen generally on discontinuous, staggered line 9—9 of FIG. 7, the second valve being pilot-controlled and having a normally-closed configuration and being shown in a closed condition.

Referring also to FIG. 9, a pilot conduit 167 extends from the outlet manifold connection 99 of the signal manifold member 95 of the first valve into the pilot manifold connection 162 of the second valve apparatus 152. A second intermediate transfer plate 169 is positioned between a body side wall portion 171 of the second valve apparatus and the second signal supply manifold member 158. The member 158 has an inlet manifold connection 172, an outlet manifold connection 173, and an exhaust manifold connection 175 which correspond to the equivalent connections 91, 99 and 100 for the manifold member 95. In this application, the manifold connections, 172, 173 and 175 are all closed by respective sealing plugs 178, 179 and 180 respectively as they are not required.

The second supply manifold member 154 has axially aligned supply and discharge ports 187 and 188 respectively, which are generally similar to the corresponding ports of the member 130 of FIG. 1, etc. When the two manifold members are secured together, fluid can be supplied to either outer port of the combination of supply manifold members. In FIGS. 7 and 8, a fluid supply coupling 185 is shown connected to the supply port 187 to supply fluid initially to the manifold member 154. The discharge port 188 of the second manifold member is registered with the supply port 136 of the first manifold member 130. If only two manifold members are to be stacked, as shown, a blanking plate 190 is secured to close off the discharge port 137 of the first manifold member.

In FIG. 7, it can be seen that the inlet manifold connection 172, the outlet manifold connection 173, and the exhaust manifold connection 175 are disposed with axes parallel to the main axis of the valve, not shown, so as to permit the use of identical transfer plates for either a piloted valve, or a solenoid or manually actuated valve. However, it is noted that the pilot manifold connection 162 is displaced to one side, so as to be off the axis connecting the other manifold connections. This is because the pilot signal is discharged into a location on the intermediate plate which corresponds with the solenoid valve fluid output location 116, of FIG. 4, as to be described with reference to FIG. 10. The apparatus 152 has a resilient sealing means for a normally-closed valve, as identified by an identification tab 191 extending outwardly from between the transfer plate 169 and the signal manifold member 158, so as to be visible when installed and marked "N/C" for a normally-closed valve.

Referring to FIG. 9, the valve apparatus 152 has a valve body 192 which is essentially similar to the valve body 12 of FIG. 1. The body 192 thus has an axially disposed main chamber 194 and inlet, outlet and exhaust ports 196, 197 and 198 communicating with inlet, outlet and exhaust chambers 200, 201 and 202 respectively which also communicate with the main chamber 194. The valve has an axially disposed valve actuator 205 which carries a piston 206, which piston is reciprocable within an axially disposed piston chamber 208 which encloses the main chamber. First and second piston ports 211 and 212 communicate with first and second piston spaces 213 and 214 on opposite sides of the piston 206. Because this is a normally-closed valve, a piston spring 216 is located in the first piston space 213, thus forcing the piston and valve actuator upwardly to a raised position as shown in full outline.

The valve body has a valve seat 219 disposed between the inlet and outlet chambers, and a valve poppet member 221 is forced against the seat by a valve spring 223. Inlet, outlet and exhaust bleed conduits 226, 227 and 228 communicate with the inlet, outlet and exhaust chambers 200, 201 and 202 as shown, and extend outwardly to the body side wall portion 171.

The transfer plate 169 has first and second transfer openings 231 and 232 which communicate with the first and second piston ports 211 and 212 respectively. As to be described with reference to FIG. 10, the second transfer opening 232 communicates with the pilot manifold connection 162, so as to receive the pilot signal from the first valve apparatus. Similarly, the inlet, outlet and exhaust bleed conduits 226, 227 and 228 communicate with third, fourth and fifth transfer conduits 235, 236, and 237. The five transfer openings 231, 232, 235, 236 and 237 are generally similar to the equivalent transfer openings 87, 88, 90, 92 and 93 respectively as described with reference to FIG. 1. Undesignated O-ring seals seal the transfer openings against the body side wall portion 171.

The second valve apparatus 152 also includes a second signal manifold resilient sealing means 239 which is located within complementary grooves, not shown, in an inner surface 241 of the signal manifold member 158. Because the input signal is supplied directly through the pilot conduit 167, there is no requirement to transfer air from the inlet chamber 200 into the piston space, as used in the first valve apparatus. Instead, pilot air from the first valve apparatus 10 is conducted directly into the pilot inlet signal means 160 which feeds directly to a location equivalent to output from the solenoid valve, through the second transfer opening 232 and into the second piston port 212.

The individual structural components of the valve apparatus 152, as opposed to the completed assembly, are identical to the components of the apparatus 10, in spite of the valve functions being reversed. This simplifies manufacturing and stocking of parts.

Referring to FIG. 10, the second signal manifold 158 has three screw clearance openings 244 to receive securing screws for securing the manifold member to the intermediate transfer plate and to the body 152, which openings are equivalent to the clearance openings 108 of FIG. 4. The inner surface 241 of the member 158 has a plurality of grooves which have a pattern identical to that of the inner surface 96 of the manifold member 95 of FIG. 4. Consequently, while the pattern on the surface 241 receives the resilient sealing means 239, it could equally well receive the resilient sealing means 98 of FIG. 4. This would convert the valve to a different configuration as to be described.

The resilient sealing means 239 has a first transfer groove 247 which extends from the location of the third transfer opening 235 to a location of a fluid input location 249. The location 249 corresponds to the solenoid valve fluid input location 115 of FIG. 4, and would be used only if a solenoid valve were used in this application. As the solenoid valve is not being used, air discharged from the inlet bleed conduit 226 (FIG. 9) through the third transfer opening 235 is trapped within the first transfer passage 247, as there is no discharge from the location 249. The resilient sealing means also has a second transfer grove 252 which extends between a fluid output location 250 to the second transfer opening 232. The fluid output location 250 corresponds to the fluid output location 116 of FIG. 4, and thus serves as an input signal connection and receives air directly from the pilot manifold connection 162 which is then fed along the groove 252 into the second transfer opening 232, where it is then discharged into the second piston space 214 (FIG. 9). If this valve were a solenoid controlled valve, instead of a pilot-operated valve, the fluid output location 250 would receive fluid controlled by the solenoid valve and transferred from the fluid input location 249.

The resilient sealing means 158 also has a third transfer grove 254 which extends from the first transfer opening 231 to the fifth transfer opening 237, and thus transfers air from the first piston space 213 (FIG. 9) into the exhaust port 198 (FIG. 9). Thus the second and third grooves 252 and 254 serve as inlet and outlet conduits for the piston spaces, and correspond to the grooves 118 and 122 of FIG. 4.

The operation of the combination of the normally-open valve apparatus 10, and the normally-closed valve apparatus 152 functions in an overall generally similar manner to that of other prior art valve combinations of this configuration. However, the structure which permit interchangeability of valve components and to alter the configurations results in a different routing of air passages as follows.

The description following assumes that valve combination is controlling two separate components through the outlet ports 18 and 197 of the apparatus 1 and 152 respectively. As shown, the outlet signal from the valve apparatus 10 simultaneously produces a pilot signal which controls actuation of the valve apparatus 152 as follows. With no pilot signal, the valve apparatus 152 is closed, as shown in FIG. 9. When the valve apparatus 10 is actuated, the pilot signal is essentially simultaneously generated by the valve apparatus 10, and is fed along the pilot conduit 167 to enter the pilot manifold connection 162. It is added that the interconnected supply manifold members 130 and 154 are pressurized, so that, in FIG. 9, the inlet chamber 200 is pressurized, thus holding the valve poppet member 221 against the seat 219.

Referring again to FIG. 10, the air from the pilot signal passes into the fluid output location 250, and along the second transfer groove 252 and into the second transfer opening 232, from where it passes into the second piston space 214 (FIG. 9).

Referring again to FIG. 9, the air pressure in the space 214 applies a force to the piston 206 in opposition to force from the spring 216. This forces the valve actuator 205 downwardly, thus moving the valve poppet member 221 from its seat 219, which position is not shown in FIG. 9. When the valve is open, air from the inlet chamber 200 passes around the poppet valve member, past the valve seat 219 and out through the outlet port 197 to the second apparatus to be controlled.

Referring to FIG. 9, air discharged from the first piston space by the movement of the piston is displaced through the first piston port, and into the first transfer opening 231. Referring to FIG. 10, this displaced air then passes along the third transfer groove 254 to the fifth transfer opening 237, from where it passes through the exhaust bleed conduit 228 to pass outwardly through the exhaust port 198.

When the pilot signal is stopped, force from the spring 216 overcomes decreased air pressure within the second piston space 214, and thus air in the second piston space is then displaced outwardly into the pilot conduit 212, the transfer opening 232 and into the groove 252. From here the air passes into the pilot conduit 167, into the manifold connection 99 of the apparatus 10 (FIG. 1), and into the outlet chamber 22 from where it vents to the exhaust port 19 through the now unobstructed valve seat 24.

It can be seen that the operation of the pilot actuated, normally-closed valve apparatus 152, with the appropriate differences is essentially similar to the solenoid actuated, normally-open valve. Because most of the components are identical, it can been seen that interchangeability of parts is possible, with the exception of the signal manifold member 158, which is adapted to receive a pilot signal, as opposed to the signal manifold member 95, which receive a solenoid valve. Notwithstanding the differences between the signal manifold members, the groove recesses in the respective inner faces 96 and 241 are identical, and this permits the interchangeability of the sealing means 98 of the normally-open valve in FIG. 1, for the resilient sealing means 239 of the normally-closed valve of FIG. 9.

It can be seen the main differences between the sealing means 98 in FIG. 4, and 239 in FIG. 10 relates to the interconnections between the first and second piston ports, the fluid output locations and the fourth and fifth transfer openings. This simple interchangeability of resilient means provides great flexibility for changing the configuration of a valve in the field. Clearly, by positioning the piston spring in either the first or second piston space, and with suitable selection of resilient sealing means, two oppositely functioning combinations of valves can be obtained. The number of combinations is further increased by providing input means which are responsive to three different types of input signals, namely an electrical signal to actuate the solenoid valve 104 of FIG. 1, a fluid or pilot signal to pass into the pilot manifold connection 162 of FIG. 7, or a manual signal to control output from a manually actuated fluid control valve, not shown. The manually actuated control valve is not described as it is considered to be functionally equivalent to the solenoid valve 104 of FIG. 1, both of which are input valves. The manual input valve would have an output connected to the second signal manifold member 158 of the valve apparatus of FIGS. 7 through 10. The manually actuated control valve could be located adjacent to, or remote from, the valve apparatus, and preferably would use the same supply air as that fed into the supply manifold member, for example by connecting an external conduit to the inlet manifold connection 91 or 172 which receives air from he respective inlet chamber. The manually actuated control valve is a 3-way fluid valve having an external output line to feed fluid into the pilot manifold connection 162 of FIGS. 7 through 9. Clearly, the appropriate resilient sealing means would be fitted between the manifold member and the valve body itself, for example the sealing means 98 would be used for a normally open valve, or the sealing means 239 would be used for a normally closed valve. Thus, with most of the components of the valve being interchangeable, a maximum of six different possibilities can be attained, namely normally-open or normally-closed configurations with one of the three different input means as described above.

This simplicity of changing the valve configuration contrasts with prior art valves known to inventor, because a simple "field" modification is not normally possible. This versatility clearly increases chances for successful "impromptu" repairs and substitutions in the field, and simplifies manufacturing, stocking and repairs to such valves.

Because the valve bodies of both apparatus are fabricated from several different components for versatility, termed "modular construction", the body side wall portions 82 and 171 have joints in which surfaces on each side of the joints are essentially impossible to seal, and thus would be prone to leakage, and furthermore would be difficult to maintain flat. To avoid leakage problems, and to increase tolerance to surface variations with adjacent components on the side walls, the intermediate transfer plates 83 and 169 are used. These transfer plates have a plurality of O-rings surrounding the transfer openings on the inner surfaces thereof to seal against of the bleed conduits and piston ports to provide suitable conduits therebetween. The plates have a flat surface on the outer side thereof which provides an essentially leak proof surface against which the resilient sealing means 98 and 239 are compressed. It can be seen that the transfer openings of the intermediate transfer plate provides sealable conduits between the piston port distributing means and the piston ports to transfer input signals into the piston chamber, and to transfer signals between the bleed conduits and the manifold connections of the signal manifold member. Clearly, if the body side walls of the valves were made from one piece, and were flat, the intermediate transfer plates could be eliminated. While this would eliminate some components, manufacturing and installation difficulties would likely arise. Nevertheless, the signal manifold members 95 and 158 could, if necessary, be used immediately adjacent to the body side wall portion.

It can be seen that much of the versatility of this invention resides in the fluid signal input means which include replaceable piston port distributing means, namely at least the signal manifold members 95 and 158, and the signal manifold resilient sealing means 98 and 239. When used with a modular valve body, the intermediate transfer plates 83 and 169 are included. These replaceable piston port distributing means cooperate with the first and second piston ports to admit fluid pressure as required into one of the piston ports, and to permit fluid to discharge from the remaining piston port. It can be seen that the fluid signal input means has an inner portion having interchangeable conduit means for providing at least one interchangeable conduit for selectively communicating with a requisite piston port. Clearly the input means has an opening which selectively communicates the fluid input port connection with the interchangeable conduit to conduct fluid to the requisite piston port. The fluid signal manifold member has at least one fluid signal port communicating with the inner surface thereof, and the signal manifold resilient sealing means is disposed between the valve body and the signal manifold member to provide transfer conduits between the sealing means and the body. The transfer conduits communicate with the fluid signal input and piston ports to admit fluid into, and to discharge fluid from, the respective piston ports.

While there are several alternative means of providing this versatility, preferably the inner surface of the signal manifold member has a plurality of groove recesses to receive the signal manifold resilient sealing means, which has a plurality of laterally spaced apart groove portions. When the sealing means is in the groove recesses and sandwiched between the signal manifold member and the valve body, transfer grooves are defined to provide at least two transfer grooves communicating the piston port and the fluid input. As can be seen, a groove recess has a respective depth, and the signal manifold resilient sealing means has a thickness slighter greater than depth of the recess so as to be compressed when inserted between the signal manifold member and the valve body, so as to improve sealing between the sealing means and the valve body.

I claim:

1. A valve apparatus including:
   (a) a valve body having: an axially disposed main chamber; an inlet port, and outlet port and an exhaust port communicating with the main chamber; a valve seat disposed between the main chamber and the inlet port; and axially disposed piston chamber, and first and second piston ports communicating with the piston chamber and being accessible at an outer surface of the body,
   (b) a valve poppet member engageable with the valve seat to seal the main chamber from the inlet port,
   (c) a piston dividing the piston chamber into first and second piston spaces, the piston being reciprocable within the piston chamber between first and second extreme positions within the piston chamber, the first and second piston spaces communicating with the first and second piston ports respectively,
   (d) a valve actuator cooperating with the piston and the poppet valve member to actuate the valve member when required,
   (e) piston biasing means for biasing the piston to apply force thereto, the piston biasing means being located within the first piston space to apply force to the piston in a first direction, the piston biasing means also being alternatively locatable within the second piston space to apply force to the piston in a second direction opposite to the first direction, so that direction of force of the biasing means is selectable to move the piston to an extreme position thereof in either direction,
   (f) fluid signal input means for receiving fluid signals and communicating with a fluid supply, the fluid signal input means being releasably secured to the valve body adjacent to both piston ports so as to communicate therewith, the fluid signal input means having inner and outer portions, the outer portion having an input signal connection to receive an input signal, and the inner portion having interchangeable conduit means for providing at least one interchangeable conduit for selectively communicating with a requisite piston port, the interchangeable conduit means communicating with the fluid supply and having an inlet conduit extending from the input signal connection to the second piston space to supply a fluid force to the piston in opposition to the piston biasing means, and an outlet conduit extending from the first piston space to exhaust fluid from the first piston space, the interchangeable conduit means having a periphery which encloses the two piston ports so that, if required, the interchangeable conduit means could alternatively provide a conduit from the input signal connection to the first piston space to supply a fluid force to the piston in opposition to force from the piston biasing means which can be alternatively located in the second piston space.

2. A valve apparatus as claimed in claim 1 in which:
   (a) the body has inlet, outlet and exhaust chambers communicating with the inlet, outlet and exhaust ports respectively, and an inlet bleed conduit, an outlet bleed conduit and an exhaust bleed conduit communicating respectively with the inlet, outlet, and exhaust chambers respectively, the body also having a body sidewall portion extending so as to encompass the piston ports and the bleed conduits,
   (b) the fluid signal input means including a signal manifold member having inner and outer surfaces and being releasably secured to the body sidewall portion of the valve assembly, the manifold member having at least one fluid signal input port which communicates with the inner surface,
   (c) the signal input means including a signal manifold resilient sealing means being disposed between the body sidewall portion of the valve assembly and the signal manifold member to provide conduits between the signal manifold member and the valve body, the conduits communicating with the fluid signal inlet port and the piston ports, and at least one bleed conduit to transfer fluid to and from the piston ports, and to and from a bleed conduit.

3. A valve apparatus as claimed in claim 2 in which the fluid signal input means further comprises:
   (a) an intermediate transfer plate disposed between the body sidewall portion and the signal manifold member so that the signal manifold resilient sealing means is sandwiched between the inner surface of the signal manifold member and the transfer plate, the intermediate transfer plate having transfer openings providing sealable conduits between the piston port distributing means and the piston ports, and between the bleed conduits and manifold connections of the signal manifold member,
   (b) the inner surface of the signal manifold member having at least one recess to receive the resilient sealing means,
   (c) the signal manifold member resilient sealing means having a plurality of laterally spaced apart groove portions which, when fitted in the respective groove recesses and sandwiched between the inner surface of the signal manifold member and the transfer plate, define transfer grooves which provide at least two transfer grooves communicating with the piston ports, and at least one transfer groove communicating with one of the bleed conduits, and a manifold connection.

4. A valve apparatus is claimed in claim 3 in which:
   (a) the recess has a depth,
   (b) the signal manifold resilient sealing means has a thickness slightly greater than depth of the recess so as to be compressed when sandwiched between the signal manifold member and the body so as to improve sealing therebetween.

5. A valve apparatus as claimed in claim 3 in which the resilient sealing means includes groove portions which cooperates with the manifold member and the transfer plate to provide:
   (a) a first transfer groove extending from inlet bleed conduit to a fluid signal input location,
   (b) a second transfer groove extending from a fluid output location to a piston port,
   (c) a third transfer grove extending from the remaining piston port to the exhaust bleed conduit.

6. A valve apparatus is claimed in claim 3 in which:
   (a) the fluid signal input means is controlled by a 2-position input valve, the input valve communicating with a valve fluid input location, (b) the inlet bleed means communicating with a valve fluid input location,
(c) one of the piston ports communicating with a valve fluid output location.

7. A valve apparatus is claimed in claim 2 further comprising:
(a) a second valve apparatus cooperating with the first valve apparatus, the second valve apparatus having a valve body, a signal manifold member, a valve poppet member, and a piston biasing means; the valve body, the valve poppet member, and the piston biasing means being essentially identical to those of the first valve apparatus, the second valve apparatus having a fluid signal input means which includes a replaceable piston port distributing means which cooperates with the first and second piston ports to admit fluid pressure as required into one of the piston ports, and to permit fluid to discharge from the remaining piston port, the signal manifold member of the second valve apparatus having inner and outer surfaces and being releasably secured to the valve body adjacent the piston ports and having at least one fluid signal input means communicating with the inner surface thereof, and,
(b) a second signal manifold resilient sealing means being disposed between the valve body of the second valve apparatus and the signal manifold member of the second valve apparatus to provide conduits between the sealing means and the valve body thereof, the conduits communicating with the fluid signal input means and the piston ports to admit fluid into, and to discharge fluid from, the respective piston port,
(c) a pilot conduit extending from the first valve apparatus to the second valve apparatus, and communicating with the fluid signal, input means of the second valve apparatus so that the first valve apparatus provides a pilot signal to the second valve apparatus.

8. A valve apparatus as claimed in claim 7 in which:
(a) the signal manifold member of the first valve assembly has an outlet manifold connection communicating with the outlet chamber and connected to the pilot conduit;
(b) the fluid signal input means of the signal manifold member of the second valve assembly has a pilot signal inlet means which communicates the pilot conduit with one of the piston ports.

9. A valve apparatus as claimed in claim 8 in which:
(a) the second signal manifold resilient sealing means has a transfer groove extending from the pilot inlet signal means to the said one of the piston ports, so as to permit transfer of fluid therebetween.

10. A valve apparatus as claimed in claim 7 further including:
(a) first and second supply manifold members, each supply manifold member having a respective manifold body having a main bore extending therethrough, the main bore having supply and discharge ports at opposite ends thereof, each manifold body also having a valve port communicating with the respective main bore thereof,
(b) the first and second supply manifold members also having first fastening means for fastening the supply manifold member to the respective valve apparatus to permit the valve port of the first supply manifold member to communicate with the inlet port of the first valve apparatus, and the valve port of the second supply manifold member to communicate with the inlet port of the second valve apparatus,
(c) the first and second supply manifold members also having second fastening means for fastening the first supply manifold member to the second supply manifold member so that the discharge port of the first supply manifold member is registered with the supply port of the second supply manifold member to interconnect the respective main bores of the manifold members to permit the supply manifold members to be stacked in series to pass fluid through the interconnected main bores to supply fluid to respective valve apparatus.

11. A valve apparatus as claimed in claim 1 further including a supply manifold member having:
(a) a manifold body having a main bore extending therethrough, the main bore having supply and discharge ports at opposite ends thereof, the manifold body also having a valve port communicating with the main bore thereof,
(b) first fastening means for fastening the supply manifold member to the valve apparatus to permit the valve port of the supply manifold member to communicate with the inlet port of the valve apparatus.

12. A valve apparatus as claimed in claim 1 in which:
(a) the piston chamber surrounds the main chamber
(b) the main chamber has a main side wall having an annular clearance opening therein having an annular axial width to accommodate movement of the piston,
(c) the piston extends through the clearance opening.

13. A valve apparatus as claimed in claim 1 in which:
(a) the valve actuator is a sleeve having a sleeve bore which communicates the outlet port with the exhaust port.

14. A valve apparatus as claimed in claim 13 further including:
(a) a valve biasing means urging the valve poppet member against the valve seat so as to close the valve,
and in which:
(b) the sleeve has inner and outer ends generally adjacent the outlet and exhaust ports respectively,
(c) the inner end of the sleeve is adapted to contact the valve member to unseat the valve member as required.

15. A valve apparatus as claimed in claim 14 in which:
(a) the valve biasing means is a valve spring cooperating with the poppet valve member to urge the valve member against the valve seat to close the valve as required.

16. A valve apparatus as claimed in claim 1 in which:
(a) the valve member has a periphery having clearance means to permit fluid to pass the valve member when valve member is clear of the valve seat, so as to permit fluid to pass to the outlet port.

17. A valve apparatus as claimed in claim 1 in which:
(a) the valve is a normally-open valve,
(b) the first and second piston spaces are located on sides of the piston adjacent the outlet and exhaust ports respectively,
(c) the piston biasing means is a compression spring means which is located within the second piston space.

18. A valve apparatus as claimed in claim 17 further including:

(a) a transfer conduit extends between the fluid signal input means and the first piston space to admit fluid thereinto to apply a force to the piston in opposition to force from the spring means, (b) a transfer conduit extends between the second piston space and the exhaust port to discharge fluid from the second piston space into the exhaust port.

19. A valve apparatus as claimed in claim 1 in which:
(a) the valve is a normally-closed valve,
(b) the first and second piston spaces are located on sides of the piston adjacent the outlet and exhaust ports respectively,
(c) the piston biasing means is a compression spring means which is located in the first piston space.

20. A valve apparatus as claimed in claim 19 in which:
(a) a transfer conduit extends between the fluid signal input means and the second piston space to admit fluid thereinto to apply a force to the piston in opposition to force from the spring means,
(b) a transfer conduit extends between the first piston space and the exhaust port to discharge fluid from the first piston space to exhaust.

21. A valve apparatus as claimed in claim 1 in which the fluid signal input means comprises:
(a) a signal manifold member having an inner surface which is adjacent the inner portion of the fluid signal input means and is releasably secured to the valve body generally adjacent the first and second piston ports, the inner surface contacting the interchangeable conduit means and being generally within a plane complementary to the valve body adjacent the piston ports so as to provide a seal therewith.

22. A valve apparatus as claimed in claim 21 in which the interchangeable conduit means for providing at least one interchangeable fluid conduit for selectively communicating with a piston port includes:
(a) a signal manifold resilient sealing means disposed generally adjacent the inner surface of the signal manifold member, the resilient sealing means having a clearance to provide the interchangeable conduit extending from the input signal connection to the said piston port.

23. A valve apparatus is claimed in claim 22 in which the fluid signal input means further comprises:
(a) the inner surface of the signal manifold member having at least one groove recess to receive the resilient sealing means,
(b) the signal manifold resilient sealing means having a plurality of laterally spaced apart groove portions, which, when fitted in the respective groove recess and sandwiched between the signal manifold member and the valve body, define transfer grooves to provide at least two transfer grooves communicating the piston ports with fluid input and output means.

24. A valve apparatus as claimed in claim 23 in which:
(a) the groove recess has a depth,
(b) the signal manifold resilient sealing means has a thickness slightly greater than depth of the recess so as to be compressed when inserted between the signal manifold member and the valve body, so as to improve sealing between the sealing means and the valve body.

25. A valve apparatus as claimed in claim 23 further concluding:
(a) an intermediate transfer plate disposed between a portion of the valve body having the piston ports and the signal manifold member, so that the signal manifold resilient sealing means is sandwiched between the inner surface of the signal manifold member and the transfer plate, the intermediate transfer plate having transfer openings providing sealable conduits between the piston port distributing means and the piston ports.

26. A valve apparatus as claimed in claim 1 in which the interchangeable conduit means for providing at least one interchangeable conduit for selectively communicating with a piston port includes:
(a) a signal manifold resilient sealing means disposed generally adjacent the inner portion of the fluid signal input means, the resilient sealing means having a clearance to provide the interchangeable conduit extending from the opening communicating with the fluid port connection and the said piston port.

27. A valve apparatus including:
(a) a valve body having: an axially disposed main chamber; an inlet port, an outlet port and an exhaust port communicating with the main chamber; a valve seat disposed between the main chamber and the inlet port; an axially disposed piston chamber, and first and second piston ports communicating with the piston chamber,
(b) the valve body also having inlet, outlet and exhaust chambers communicating with the inlet, outlet and exhaust ports respectively, and an inlet bleed conduit, an outlet bleed conduit and an exhaust bleed conduit communicating respectively with the inlet, outlet and exhaust chambers respectively, the body also having a body sidewall portion extending so as to encompass the piston ports and the bleed conduits,
(c) a valve poppet member engageable with the valve seat to seal the main chamber from the inlet port,
(d) a piston dividing the piston chamber into first and second piston spaces, the piston being reciprocable within the piston chamber between first and second extreme positions within the piston chamber, the first and second piston spaces communicating with the first and second piston ports respectively,
(e) a valve actuator cooperating with the piston and the poppet valve member to actuate the valve member when required,
(f) piston biasing means cooperating with the piston to apply force thereto, direction of force of the biasing means being selectable to move the piston to an extreme position thereof,
(g) fluid signal input means communicating with at least one of the piston ports to admit fluid into the respective piston space to apply a force to the piston in opposition to force from the piston biasing means, the fluid signal input means comprising:
  (i) a signal manifold member having inner and outer surfaces and being releasably secured to the body sidewall portion of the valve assembly, the manifold member having at least one fluid signal input port which communicates with the inner surface,
  (ii) a signal manifold resilient sealing means being disposed between the body sidewall portion of the valve assembly and the signal manifold member to provide conduits between the signal manifold member and the valve body, the conduits communicating with the fluid signal inlet port and the piston ports, and at least one bleed conduit to transfer fluid to and from the piston ports, and to and from a bleed conduit, (iii) an intermediate transfer plate disposed between the body sidewall portion and the signal manifold member so that the signal manifold resilient sealing means is sandwiched between the inner surface of the signal manifold member and the transfer plate, the intermediate transfer plate having transfer openings providing sealable conduits between the piston port distributing means and the piston ports, and between the bleed conduits and manifold connections of the signal manifold member, (iv) the inner surface of the signal manifold member having at least one recess to receive the resilient sealing means, (v) the signal manifold member resilient sealing means having a plurality of laterally spaced apart groove portions which, when fitted in the respective groove recesses and sandwiched between the inner surface of the signal manifold member and the transfer plate, define transfer grooves which provide at least two transfer grooves communicating with the piston ports, and at least one transfer groove communicating with one of the bleed conduits, and a manifold connection.

28. A valve apparatus as claimed in claim 27 in which:
(a) the recess has a depth,
(b) the signal manifold resilient sealing means has a thickness slightly greater than depth of the recess so as to be compressed when sandwiched between the signal manifold member and the body so as to improve sealing therebetween.

29. A valve apparatus as claimed in claim 27 in which the resilient sealing means includes groove portions which cooperate with the manifold member and the transfer plate to provide:
(a) a first transfer groove extending from an inlet bleed conduit to a fluid signal input location,
(b) a second transfer groove extending from a fluid output location to a piston port,
(c) a third transfer groove extending from the remaining piston port to the exhaust bleed conduit.

30. A valve apparatus including:
(a) a valve body having: an axially disposed main chamber; an inlet port, an outlet port and an exhaust port communicating with the main chamber; a valve seat disposed between the main chamber and the inlet port; an axially disposed piston chamber, and first and second piston ports communicating with the piston chamber,
(b) a valve poppet member engageable with the valve seat to seal the main chamber from the inlet port,
(c) a piston dividing the piston chamber into first and second piston spaces, the piston being reciprocable within the piston chamber between first and second extreme positions within the piston chamber, the first and second piston spaces communicating with the first and second piston ports respectively,
(d) a valve actuator cooperating with the piston and the poppet valve member to actuate the valve member when required,
(e) piston biasing means cooperating with the piston to apply force thereto, direction of force of the biasing means being selectable to move the piston to an extreme position thereof,
(f) fluid signal input means providing replaceable piston port distributing means for communicating with the first and second piston ports to admit fluid pressure as required into one of the piston ports to apply a force to the piston in opposition to force from the piston biasing means, and to permit fluid to discharge from the remaining piston port, the fluid signal input means including a signal manifold member having inner and outer surfaces and being releasably secured to the valve body adjacent the first and second pistons ports, the fluid signal manifold member having at least one fluid input port communicating with the inner surface thereof, the inner surface having at least one groove recess,
(g) a signal manifold resilient sealing means being disposed within the respective groove recess between the valve body and the signal manifold member to provide conduits between the sealing means and the body, the conduits communicating with the fluid signal input port and the piston ports to admit fluid into, and to discharge fluid from, the respective piston port, the resilient sealing means having a plurality of laterally spaced apart groove portions which, when fitted in the respective groove recess and sandwiched between the signal manifold member and the valve body, define transfer grooves to provide at least two transfer grooves communicating the piston ports with the fluid input and output ports.

31. A valve apparatus as claimed in claim 30 in which:
(a) the groove recess has a depth,
(b) the signal manifold resilient sealing means has a thickness slightly greater than the depth of the recess so as to be compressed when inserted between the signal manifold member and the sealing means and the valve body.

32. A valve apparatus as claimed in claim 30 further concluding:
(a) an intermediate transfer plate disposed between a portion of the valve body having the piston ports and the signal manifold member, so that the signal manifold resilient sealing means is sandwiched between the inner surface of the signal manifold member and the transfer plate, the intermediate transfer plate having transfer openings providing sealable conduits between the piston port distributing means and the piston ports.

* * * * *